United States Patent [19]
Ueda

[11] Patent Number: 5,848,366
[45] Date of Patent: Dec. 8, 1998

[54] LOAD DRIVING CONTROL SYSTEM FOR VEHICLE EQUIPPED WITH MICROCOMPUTER

[75] Inventor: Yoshiaki Ueda, Fuji, Japan

[73] Assignee: Jatco Corporation, Fuji, Japan

[21] Appl. No.: 653,888

[22] Filed: May 28, 1996

[30] Foreign Application Priority Data

May 30, 1995 [JP] Japan .................................... 7-131623

[51] Int. Cl.⁶ .............................. F01P 11/00; G06F 7/00
[52] U.S. Cl. ................................. 701/36; 701/29
[58] Field of Search ..................... 701/1, 36, 29; 340/449; 123/41.12, 41.15; 318/471; 307/9.1, 10.1

[56] References Cited

U.S. PATENT DOCUMENTS

| | | | |
|---|---|---|---|
| 4,168,456 | 9/1979 | Isobe | 318/471 |
| 4,409,933 | 10/1983 | Inoue | 123/41.12 |
| 4,425,766 | 1/1984 | Claypole | 62/133 |
| 4,481,585 | 11/1984 | Huntzinger et al. | 364/424 |
| 4,977,862 | 12/1990 | Aihara et al. | 123/41.12 |
| 5,307,644 | 5/1994 | Cummins et al. | 62/133 |
| 5,609,125 | 3/1997 | Ninomiya | 123/41.12 |

FOREIGN PATENT DOCUMENTS 2-112611  4/1990  Japan .

Primary Examiner—Michael Zanelli
Attorney, Agent, or Firm—Foley & Lardner

[57] ABSTRACT

A load driving control system for an automotive vehicle having a load such as an electric motor for a radiator fan. The load driving control system comprises a microcomputer storing a load driving necessariness decision program by which a decision is made as to whether driving of the load is necessary or not in accordance with the detected vehicle operating condition so as to output one of load driving necessariness and unnecessariness commands. A load driving circuit is provided to provide a driving current in response to the load driving necessariness command, thereby driving the load. Additionally, a load compulsorily driving requirement circuit is provided to compulsorily drive the load when the microcomputer stops outputting each command even though an ignition key switch is turned ON.

10 Claims, 7 Drawing Sheets

LOAD DRIVING CONTROL SYSTEM FOR VEHICLE EQUIPPED WITH MICROCOMPUTER

BACKGROUND OF THE INVENTION

1. Field of the Invention

This invention relates to improvements in a load driving control system for a vehicle equipped with a microcomputer storing a load driving necessariness decision program for deciding as to whether the load is to be driven or not, and more particularly to a device for protecting an engine from being out of control even if an abnormality of the microcomputer occurs.

2. Description of the Prior Art

Hitherto, the majority of automotive vehicles are equipped with a microcomputer storing a load driving control necessariness program for deciding as to whether a load is to be driven or not. A load driving control according to the program is usually accomplished as follows: When a detected operating condition of the vehicle is decided to require driving the load, a high level voltage is output from an output port of a CPU of the microcomputer so as to drive the load. When the detected operating condition is decided not to require driving of the load, a low level voltage is output thereby to stop the driving of the load.

However, drawbacks have been encountered in the above conventional load driving control system. In other words, when an abnormality (such as program runaway, memory breakage, quenching) of the microcomputer occurs, neither the high and low level voltages are output from the output port of the CPU of the microcomputer, thereby establishing a high impedance condition at the output port. Accordingly, driving the load is unavoidably stopped unless an input such as noise or the like is input to the CPU, so that the load is abruptly operated the moment such noise as to cause a load driving circuit to be turned ON is input. This establishes an unstable condition as to whether the load is to be driven or not.

In view of the above, in usual fail-safe manners, when an abnormality arises in the microcomputer, driving load is stopped the moment the microcomputer abnormality is detected. However, in case the load corresponds to an electric motor for a fan which cools a radiator for engine coolant as disclosed in Japanese Patent Provisional Publication No. 2-112611, the fan is unavoidably stopped simultaneously with occurrence of the microcomputer abnormality thereby allowing engine coolant temperature to rise during a vehicle cruising thereafter. As a result, there is the possibility of engine overheat occurring.

SUMMARY OF THE INVENTION

It is an object of the present invention to provide an improved load driving control system for a vehicle equipped with a microcomputer, which can effectively overcome drawbacks encountered in conventional similar load driving control systems without any difficulties.

Another object of the present invention is to provide an improved load driving control system for a vehicle equipped with a microcomputer, which can effectively ensure driving a load even when abnormality of the microcomputer occurs, thereby achieving a fail-safe operation.

A further object of the present invention is to provide an improved load driving control system for a vehicle equipped with a microcomputer, which can effectively protect an engine from overheating in case that the load is an electric motor for a fan which cools an engine coolant radiator.

A load driving control system of the present invention is for a vehicle having a load "e" and comprises, as shown in FIG. 1, a vehicle operating condition detecting means "a" for detecting an operating condition of the vehicle. A microcomputer "c" is provided storing a load driving necessariness decision program "b" by which a decision is made as to whether driving of a load is necessary or not in accordance with the detected vehicle operating condition so as to output one of load driving necessariness and unnecessariness commands. A load driving circuit "d" is provided to control driving of the load in accordance with the load driving necessariness and unnecessariness commands. The load driving circuit is arranged to provide a driving current in response to the load driving necessariness command, the load being driven under the action of the driving current. Load compulsorily driving requirement means "g" is provided to compulsorily drive the load when the microcomputer stops outputting each command even though an ignition key switch "f" is turned ON.

With this load driving control system, during vehicle cruising under engine running, the operating condition of the vehicle or the engine is detected by the vehicle operating condition detecting means "a", upon which the decision is made as to whether driving the load is necessary or not in accordance with the detected vehicle operating condition so as to output one of load driving necessariness and unnecessariness commands under the action of the load driving necessariness decision program "b" stored in the microcomputer "c". Accordingly, the load "e" is driven by the load driving circuit "d" in response to the load driving necessariness command, which provides the driving current and represents the necessariness of driving the load, while the load "e" is not driven in response to the load driving unnecessariness command which does not provide the driving current and represents the unnecessariness of driving the load. When the microcomputer stops outputting each command even though an ignition key switch "f" is turned ON, the load "e" is compulsorily driven under the action of the load compulsorily driving requirement means "g". As a result, even when abnormality of the microcomputer occurs in which the commands were not output from the microcomputer even though the vehicle or the engine is in operation, driving the load "e" can be ensured thereby achieving a fail-safe driving of the load "e" as far as the vehicle or the engine is in operation.

The load driving control system of the present invention preferably comprises load driving stopping requirement means "h" for stopping the compulsory load driving at least during a time period in which initialization is completed, when the microcomputer stops outputting each command owing to the initialization of the microcomputer. By virtue of this means, the commands cannot be output from the microcomputer "c" not only when the microcomputer abnormality occurs but also during the initialization of the microcomputer "c". Assume that the load "e" is always compulsorily driven upon meeting a condition that the commands are not output from the microcomputer even if the ignition key switch "f" is turned ON. In such case, the load "e" is driven even during initialization of the microcomputer, thereby providing an unnecessary stress to the load "e". However, according to the load driving control system comprising the load driving stopping requirement means "h", when the commands are not output from the microcomputer owing to the fact that the microcomputer is in its initialization, the load is prevented from being compulsorily driven at least during a time period in which the initialization is completed. Accordingly, the unnecessary stress cannot be applied to the load "e", thereby improving the reliability in durability of the load "e".

DETAILED DESCRIPTION OF THE INVENTION

Figure 2:
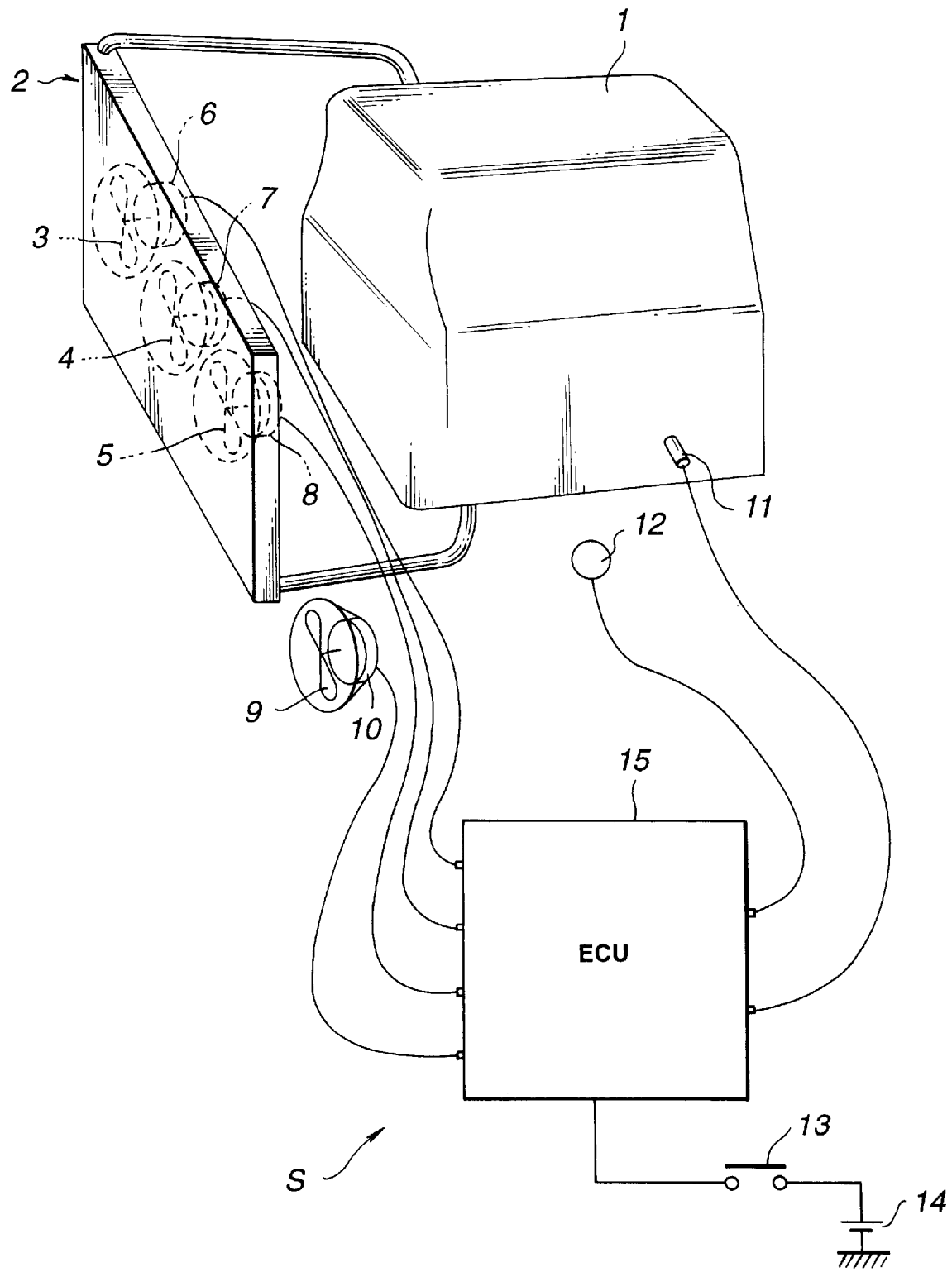
FIG. 2 is a schematic perspective view of a vehicular engine system including an embodiment of a load driving control system according to the present invention.

Referring now to FIG. 2, there is shown a preferred embodiment of a load driving control system for a vehicle equipped with a microcomputer, according to the present invention which system is illustrated by the reference character S. The vehicle of this embodiment is an automotive vehicle including an internal combustion engine 1. The engine 1 is formed therein with an engine coolant passage (not shown) through which an engine coolant (not shown) flows. The engine coolant passage is connected to a radiator 2 through which the engine coolant flows to be cooled. The engine 1 and the radiator 2 are located within an engine compartment of the vehicle.

First, second and third fans 3, 4, 5 are disposed at the back side of the radiator 2 to cause air flow through air passages formed through the radiator 2. The first, second and third fans 3, 4, 5 are respectively drivably connected to first, second and third electric motors (corresponding to load e in FIG. 1) 6, 7, 8 which drive the respective fans 3, 4, 5. A scavenging fan 9 is disposed near the radiator 2 and drivably connected to an electric motor 10 (corresponding to the load e in FIG. 1) for driving the fan 9.

Figure 1:
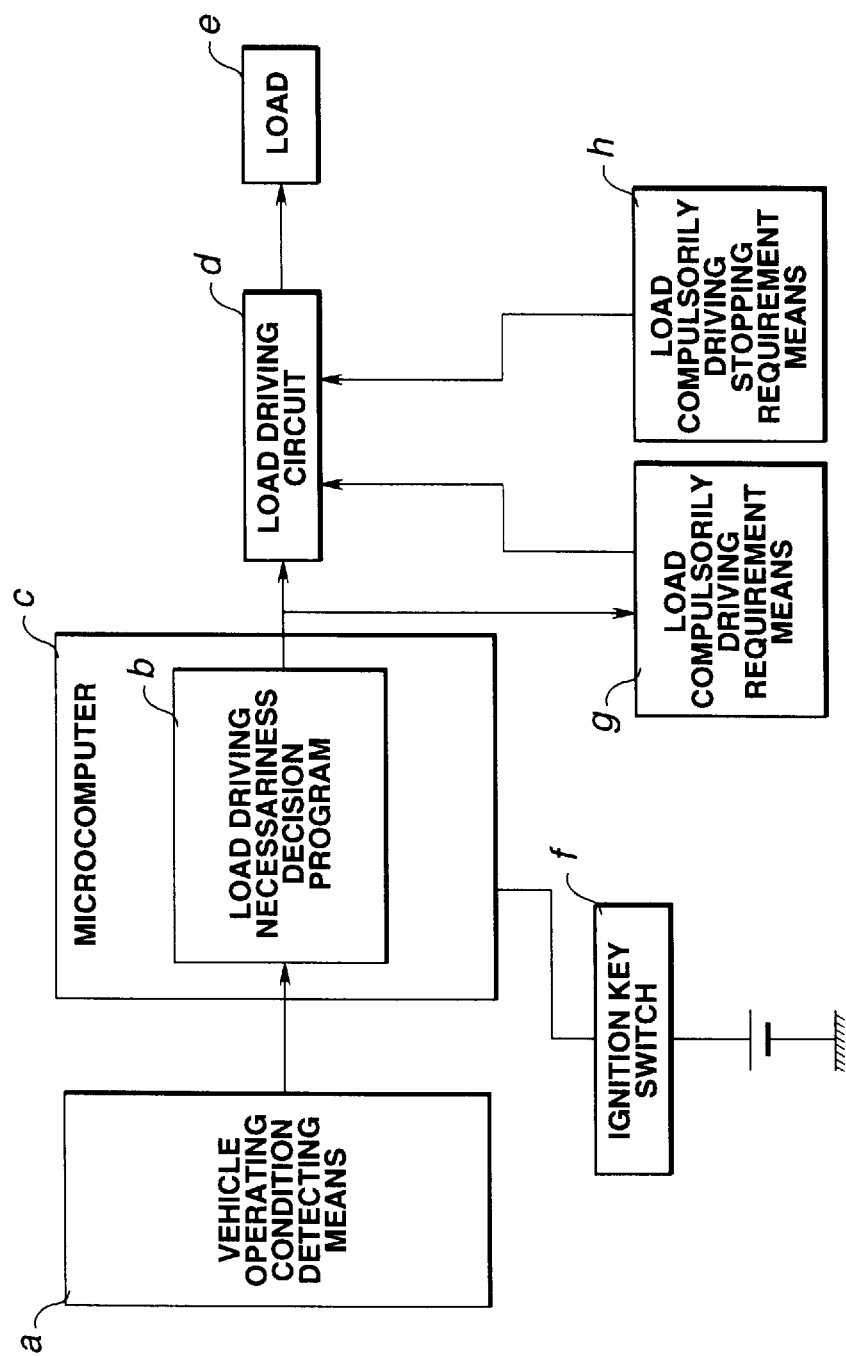
FIG. 1 is a block diagram of an idea of a load driving control system for a vehicle equipped with a microcomputer, according to the present invention.

An engine coolant temperature sensor 11 (corresponding to the vehicle operating condition detecting means a in FIG. 1) is disposed projecting in the engine coolant passage of the engine so as to detect a temperature (engine coolant temperature) of the engine coolant in the engine coolant passage. An engine compartment temperature sensor 12 (corresponding to the vehicle operating condition detecting means a in FIG. 1) is disposed near the engine 1 to detect a temperature (engine compartment temperature) within the engine compartment (not identified) in which the engine 1 is disposed.

Figure 3A:
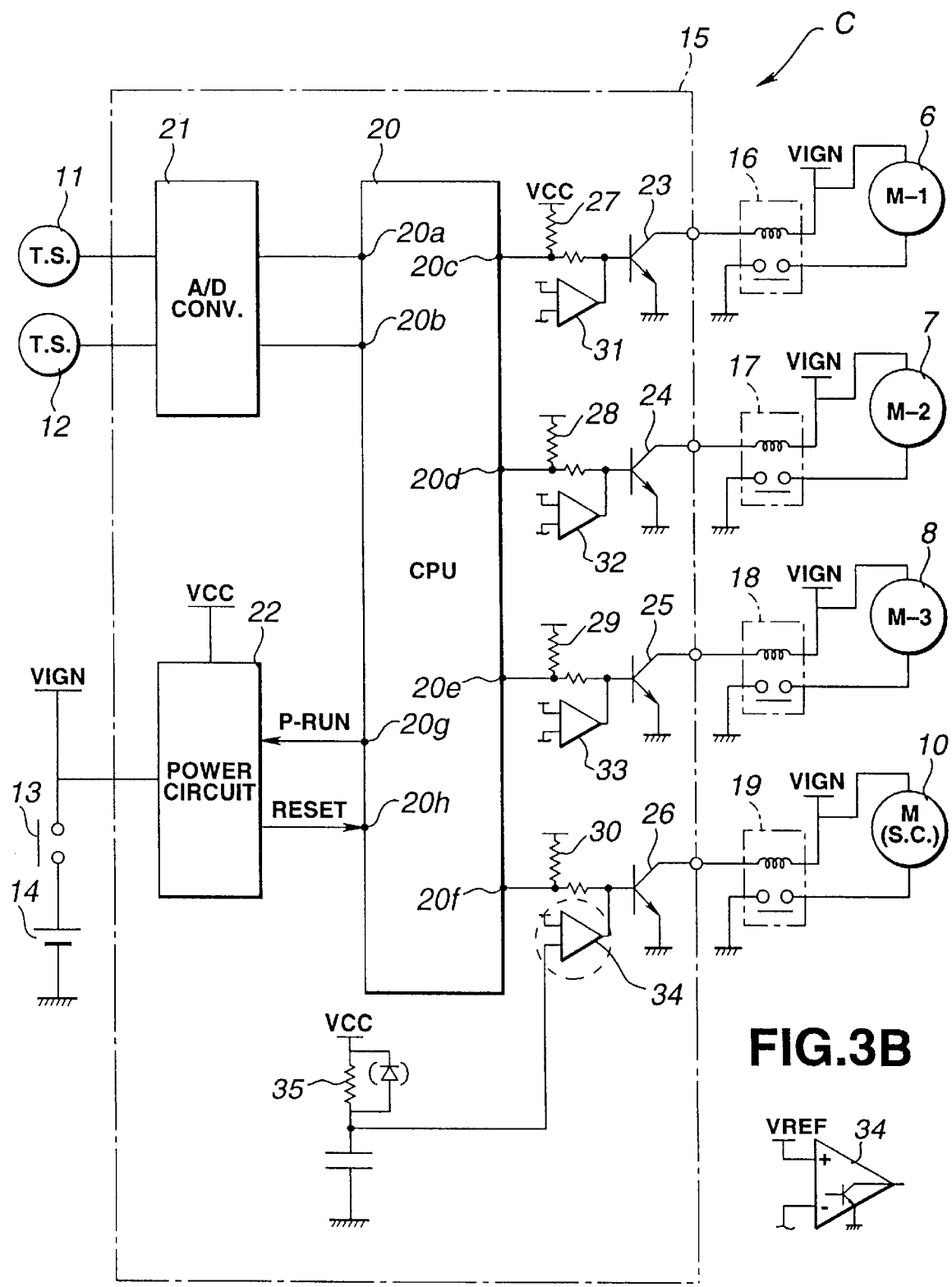
FIG. 3A is a circuit diagram of the load driving control system of FIG. 2.
Figure 3B:
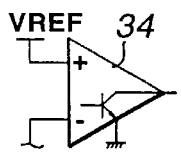
FIG. 3B is an enlarged view of the fourth comparator 34.

The load driving control system S comprises an engine control unit 15 to which the motors 6, 7, 8, 10, and the sensors 11, 12 are electrically connected. A battery 14 is electrically connected through an ignition key switch 13 to the engine control unit 15. The engine control unit 15 forms part of a load driving control circuit C shown in FIGS. 3A and 3B. The load driving control circuit C includes first, second, third and fourth relay switches 16, 17, 18, 19 which are respectively electrically connected to the motors 6, 7, 8, 10. The first, second, third and fourth relay switches 16, 17, 18, 19 are electrically connected to a central processing unit (CPU) or microcomputer 20 (corresponding to the microcomputer c in FIG. 1). The CPU 20 is electrically connected to an A/D (analog-digital) converter 21 and to a power circuit 22. The A/D converter 21 is electrically connected to the sensors 11, 12. The power circuit 22 is electrically connected to the battery 14 through the ignition key switch 13.

A first transistor 23 is electrically connected between the relay switch 16 and the CPU 20. A second transistor 24 is electrically connected between the relay switch 17 and the CPU 20. A third transistor 25 is electrically connected between the relay switch 18 and the CPU 20. A fourth transistor 26 is electrically connected between the relay switch 19 and the CPU 20. A first pull-up resistor 27 is electrically connected to a line between the transistor 23 and the CPU 20. A second pull-up resistor 28 is electrically connected to a line between the transistor 24 and the CPU 20. A third pull-up resistor 29 is electrically connected to a line between the transistor 25 and the CPU 20. A fourth pull-up resistor 30 is electrically connected to a line between the transistor 26 and the CPU 20.

A first comparator 31 is electrically connected to a line between the transistor 23 and the line to which the pull-up resistor 27 is connected. A second comparator 32 is electrically connected to a line between the transistor 24 and the line to which the pull-up resistor 28 is connected. A third comparator 33 is electrically connected to a line between the transistor 25 and the line to which the pull-up resistor 29 is connected. A fourth comparator 34 is electrically connected to a line between the transistor 26 and the line to which the pull-up resistor 30 is connected. A timer circuit 35 is electrically connected to each comparator 31, 32, 33, 34.

A load driving circuit for the first motor 7 for the first fan 3 includes the first transistor 23 which is adapted such that the base current of the transistor 23 is controlled in accordance with a high level voltage (4.5 V or higher) or a low level voltage (0.5 V or lower) transmitted to the transistor 23 from the CPU 20. This voltage is an output (decision command output) of the CPU 20. The high level voltage causes the base current to flow in the transistor 23 so as to drive the load, and therefore is called a "load driving necessariness command", whereas the low level voltage prevents the base current to flow in the transistor 23 so that the load is not driven, and therefore is called a "load driving unnecessariness command". This load driving circuit for the first motor 6 further includes the first relay switch 16 which is switched ON when the base current flows in the first transistor 23. Similarly, a load driving circuit for the second motor 7 for the second fan 4 includes the second transistor 24 and the second relay switch 17 to operate in the same manner as the load driving circuit for the first motor 6. A load driving circuit for the third motor 8 for the third fan 5 includes the third transistor 25 and the third relay switch 18 to operate in the same manner as the load driving circuit for the first motor 6. A load driving circuit for the motor 10 for the scavenging fan 9 includes the fourth transistor 26 and the fourth relay switch 19 to operate in the same manner as the load driving circuit for the first motor 3. Each load driving circuit corresponds to the load driving circuit d in FIG. 1.

A load compulsorily driving requirement circuit for the first motor 6 for the first fan 3 is electrically connected to the base side of the first transistor 23 and includes the first pull-up resistor 27 which compulsorily causes a base current to flow in the transistor 23 though a driving port 20c of the CPU is in a high impedance condition. A driving voltage Vcc (5V) is impressed on a terminal of the first pull-up resistor 27 when the ignition key switch 13 is turned ON. Similarly, a load compulsorily driving requirement circuit for the second motor 7 for the second fan 3 is electrically connected to the base side of the second transistor 24 and includes the second pull-up resistor 28 which operates similarly to the first pull-up resistor 27. A load compulsorily driving requirement circuit for the third motor 8 for the third fan 5 is electrically connected to the base side of the third transistor 25 and includes the third pull-up resistor 29 which operates similarly to the first pull-up resistor 27. A load compulsorily driving requirement circuit for the motor 10 for the scavenging fan 9 is electrically connected to the base side of the fourth transistor 26 and includes the fourth pull-up resistor 30 which operates similarly to the first pull-up resistor 27. Each load compulsorily driving requirement circuit corresponds to the load compulsorily driving requirement means g in FIG. 1.

A load compulsorily driving stop requirement circuit for the first motor 3 for the first fan 6 includes the first comparator 31 which has two input terminals and one output terminal. One of the input terminals is electrically connected to the timer circuit 35 whose voltage increases according to a time constant determined in accordance with a resistor and a capacitor. A preset voltage VREF is impressed on the other input terminal. The output terminal of the first comparator 31 is connected to the base side of the first transistor 23. Similarly, a load compulsorily driving requirement circuit for the second motor 7 for the second fan 4 includes the second comparator 32 which is arranged similarly to the first comparator 31. A load compulsorily driving requirement circuit for the third motor 8 for the third fan 5 includes the third comparator 33 which is arranged similarly to the first comparator 31. A load compulsorily driving requirement circuit for the motor 10 for the scavenging fan 9 includes the fourth comparator 34 which is arranged similarly to the first comparator 31. Each load compulsorily driving requirement circuit corresponds to the load driving stopping requirement means h in FIG. 1.

The CPU 20 stores therein a load driving necessity decision program which decides as to whether driving the respective motors 6, 7, 8, 10 is necessary or not in accordance with driving conditions of the motors 6, 7, 8, 10. The CPU 20 has input ports 20a, 20b which are connected to the A/D converter 21, so that a signal from the sensor 11, 12 is input through the input port 20a, 20b to the CPU 20 upon being A/D-converted. Additionally, the CPU 20 has the driving port 20c and driving ports 20d, 20e, 20f through which the high level voltage or the low level voltage as the decision command output is output. The CPU 20 has a program run signal output port 20g through which a program run signal P-RUN is output to the power circuit 22. The program run signal makes its inversion at a predetermined cycle or at the intervals of a predetermined time during a normal operation of the CPU 20. The power circuit 22 is adapted to output a reset signal for resetting the program in the CPU 20, upon making such a decision that a program runway occurs in the CPU 20. This decision is made in response to stopping of the inversion of the program run signal P-RUN. The CPU 20 has a reset signal input port 20h connected to the power circuit 22. The reset signal is input through the reset signal input port 20h to the CPU 20.

The A/D converter 21 functions to convert an analog signal from the engine coolant sensor 11 and the engine compartment temperature sensor 12 to a digital signal to be used for operations performed by the CPU 20.

The power circuit 22 produces a driving voltage Vcc (5V) from an ignition voltage VIGN (12V) to be supplied from the battery 14, when the ignition key switch 13 is turned ON. The power circuit 22 includes a fail detecting circuit (not identified) which is arranged to decide as to whether the program runaway occurs or not upon watching the program run signal P-RUN and to output the reset signal in response to a decision representing occurrence of an abnormality (such as the program runaway) in the CPU 20 occurs.

Figure 4:
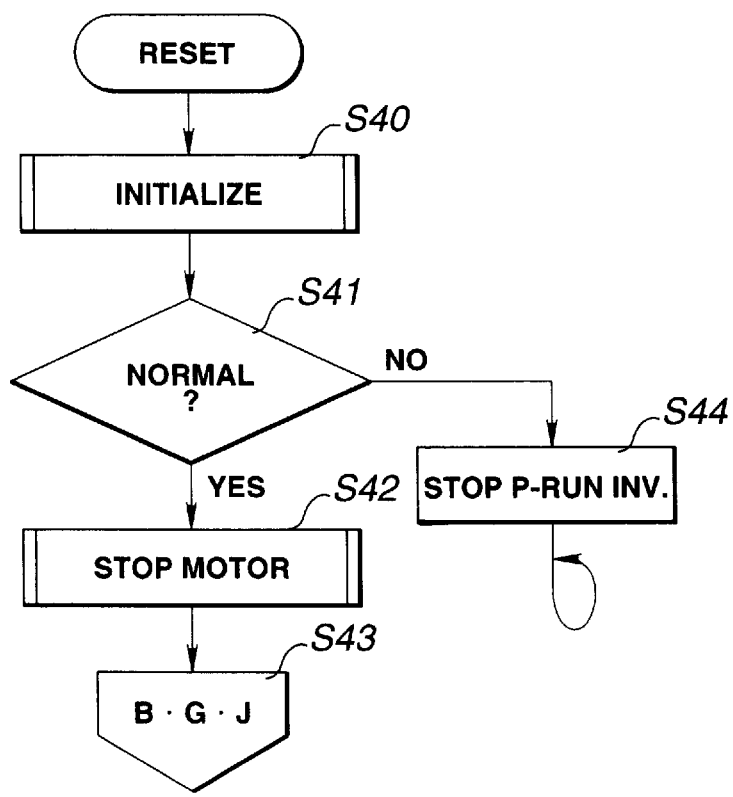
FIG. 4 is a flowchart showing a load driving control executed by a CPU in the load driving control system of FIG. 2.

Next, a manner of operation of the load driving control system S will be discussed with reference to FIGS. 4 and 5.

Load Driving Control

A load driving control performed by the CPU 20 of the load driving control system S of this embodiment will be discussed with reference to a flowchart of FIG. 4.

At a step S40, after the ignition key switch 13 is turned ON, the reset signal at a high (Hi) level is output upon rise of the driving voltage Vcc. Simultaneously, an initialization treatment is made for a predetermined time.

At a step S41, a determination is made as to whether a stored memory of the program is normal or not. If normal, a flow goes to a step S42 at which the respective motors 6, 7, 8, 10 for the fans are compulsorily stopped during a time period from a time point of rise of the driving voltage Vcc to a preset time point.

Figure 5:
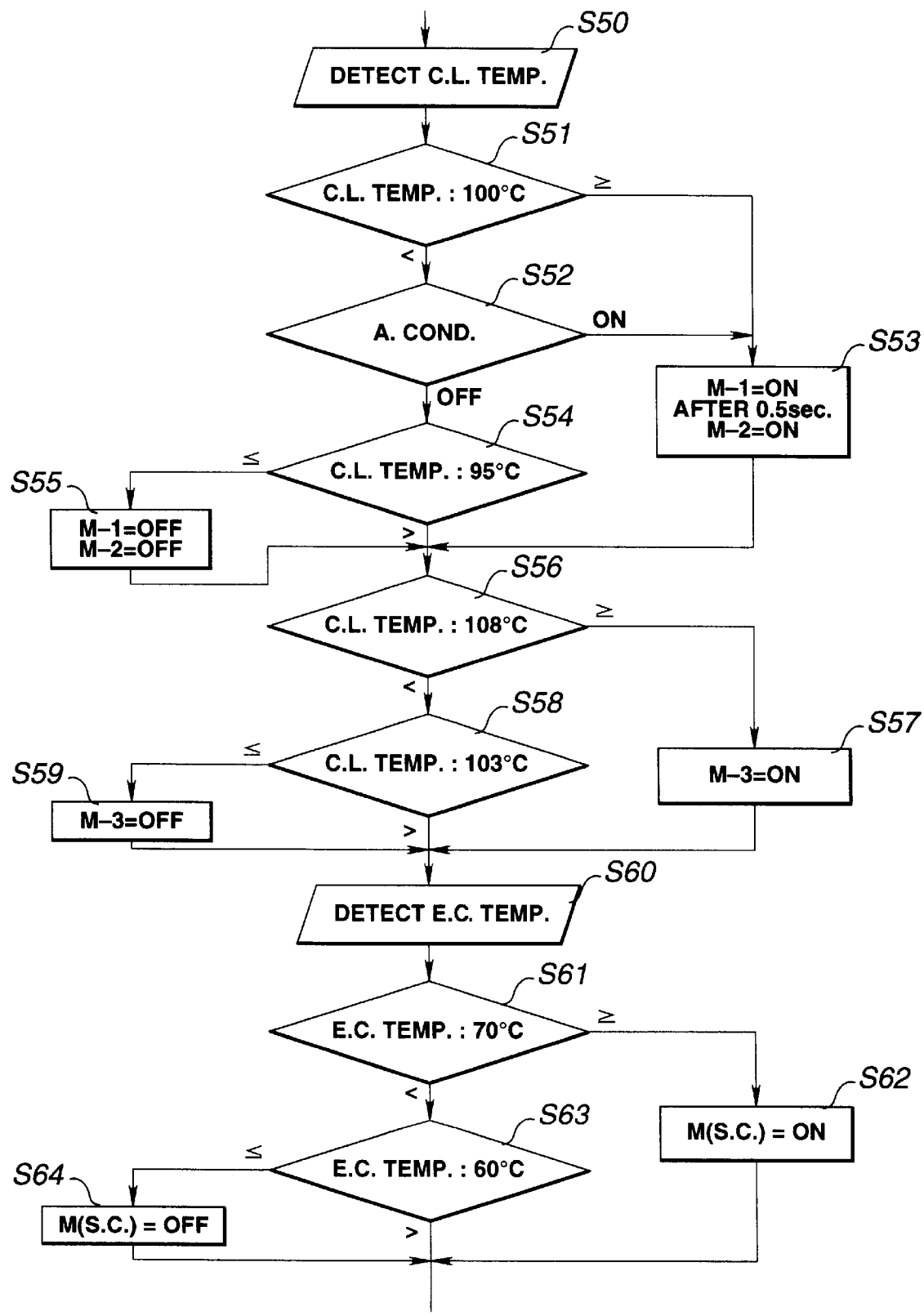
FIG. 5 is a flowchart of a background job forming part of the load driving control of FIG. 4.

At a step S43, when time lapses over the preset time point for terminating the compulsory stop of the respective motors 6, 7, 8, 10, the load driving control is performed in accordance with a background job (B.G.J) shown in a flowchart of FIG. 5.

Turning back to the step S41, when the program stored memory is confirmed or detected to be not normal, the flow goes to a step S44 at which the inversion of the program run signal P-RUN is stopped. When the inversion of the program run signal P-RUN is stopped, the reset signal or pulse at a low (Lo) level is output from the power circuit 22 which is watching the program run signal P-RUN, to the CPU 20 so as to stop the operation of the CPU 20.

The background job at the step S43 is performed according to the flowchart of FIG. 5. The background job corresponds to the load driving necessity decision program b in FIG. 1.

At a step S50, an engine coolant temperature is detected in accordance with the signal from the engine coolant temperature sensor 11.

At a step S51, a decision is made as to whether the engine coolant temperature is not lower than 100° C. or not.

At a step S52, a decision is made as to whether an air-conditioner (not shown) is switched ON or OFF.

At a step S53, the first motor 6 for the first fan 3 is switched ON while the second motor 7 for the second fan 4 is switched ON after 0.5 second from the initiation of rotation of the first motor 6, when the engine coolant temperature is not lower than 100° C., or when the air-conditioner is switched ON though the engine coolant temperature is lower than 100° C.

At a step S54, a decision is made as to whether the engine coolant temperature is not higher than 95° C. or not.

At a step S55, the first motor 6 for the first fan 3 and the second motor 7 for the second fan 4 are simultaneously switched OFF when the engine coolant temperature is not higher than 95° C.

At a step S56, a decision is made as to whether the engine coolant temperature is not lower than 108° C. or not.

At a step S57, the third motor 8 for the third fan 5 is switched ON when the engine coolant temperature is not lower than 108° C.

At a step S58, a decision is made as to whether the engine coolant temperature is not higher than 103° C. or not.

At a step S59, the third motor 8 for the third fan 5 is switched OFF when the engine coolant temperature is not higher than 103° C.

At a step S60, the engine compartment temperature is detected in accordance with the signal from the engine compartment sensor 12.

At a step S61, a decision is made as to whether the engine compartment temperature is not lower than 70° C. or not.

At a step S62, the motor 10 for the scavenging fan 9 is switched ON when the engine compartment temperature is not lower than 70° C.

At a step S63, a decision is made as to whether the engine compartment temperature is not higher than 60° C. or not.

At a step S64, the motor 10 for the scavenging fan 9 is switched OFF when the engine compartment temperature is not higher than 60° C.

Here, control for the above background job is summarized as follows:

(1) Concerning a driving condition in which the first, second and third motors 6, 7, 8 are driven:

The first motor 6 for the first fan 3 is rotationally driven when the engine coolant temperature is not lower than 100° C. or during operation of the air-conditioner, and stopped when the engine coolant temperature is not higher than 95° C. or when operation of the air-conditioner is stopped.

The second motor 7 for the second fan 4 is initiated to rotate after 0.5 second from the initiation of rotation of the first motor 6 for the first fan 3, and stopped simultaneously with the first motor 6.

This is because rush current increases thereby to provide an variation in battery voltage if both the first and second motors 6, 7 are simultaneously initiated to be rotationally driven.

The third motor 8 for the third fan 5 is initiated to rotate at an engine coolant temperature of not lower than 180° C., and stopped at an engine coolant temperature of not higher than 103° C.

(2) Concerning a driving condition in which the motor 10 for the scavenging fan 9 is driven:

The motor 10 for the scavenging fan 9 is initiated to rotate at an engine compartment temperature of not lower than 70° C. and stopped at an engine compartment temperature of not higher than 60° C. under a condition in which the ignition key switch 13 is turned ON.

After the ignition key switch 13 is turned OFF, the motor 10 continues to rotate for 360 seconds or until the engine compartment temperature becomes a level of not higher than 75° C. in case that the engine compartment temperature has become a level of not lower than 85° C. within a time period of 600 seconds from a time point of the key switch 13 having been turned OFF. At this time, power is supplied to the motor 10 from a power supply circuit (not shown), in which supply of this power is automatically stopped in timed relation to the stopping in driving of the motor 10 for the scavenging fan 9.

Control made when the engine key switch 13 is turned ON

The ignition key switch 13 is turned OFF in the vehicle equipped with the load driving control system of the embodiment during cruising of the vehicle, and immediately thereafter, the engine key switch 13 is again turned ON. Operation made in such a case will be discussed with reference to FIG. 6.

When the ignition key switch 13 is switched ON, the ignition voltage VIGN rises to 12V so that the driving voltage Vcc (5V) is produced by the power circuit 22. When the driving voltage Vcc is stabilized at a level of 5V, resetting for the CPU 20 is canceled so as to change the output from the low (Lo) level state to the high (Hi) level state. After a time t1 from the time point at which the ignition key switch 13 has been turned ON, the program in the CPU 20 is initiated to run, the initialization is executed for a time t2. After completion of the initialization, operation comes into a driving decision control.

During this, in each load driving circuit, a voltage at the input terminal of each comparator 31, 32, 33, 34 to which the timer circuit 35 is connected gradually increases since the initiation of rise of the driving voltage Vcc.

Until this input terminal voltage has reached the preset voltage VREf, the output terminal of each comparator 31, 32, 33, 34 is turned ON (producing a low resistance), so that the voltage at the base of the transistor 23, 24, 25, 26 connected to the above output terminal of the comparator is suppressed at an about zero level (0V to 0.8V). Consequently, each relay switch 16, 17, 18, 19 is kept at an OFF state, so that each motor 6, 7, 8, 10 is compulsorily stopped in driving for each fan 3, 4, 5, 9.

Figure 6:
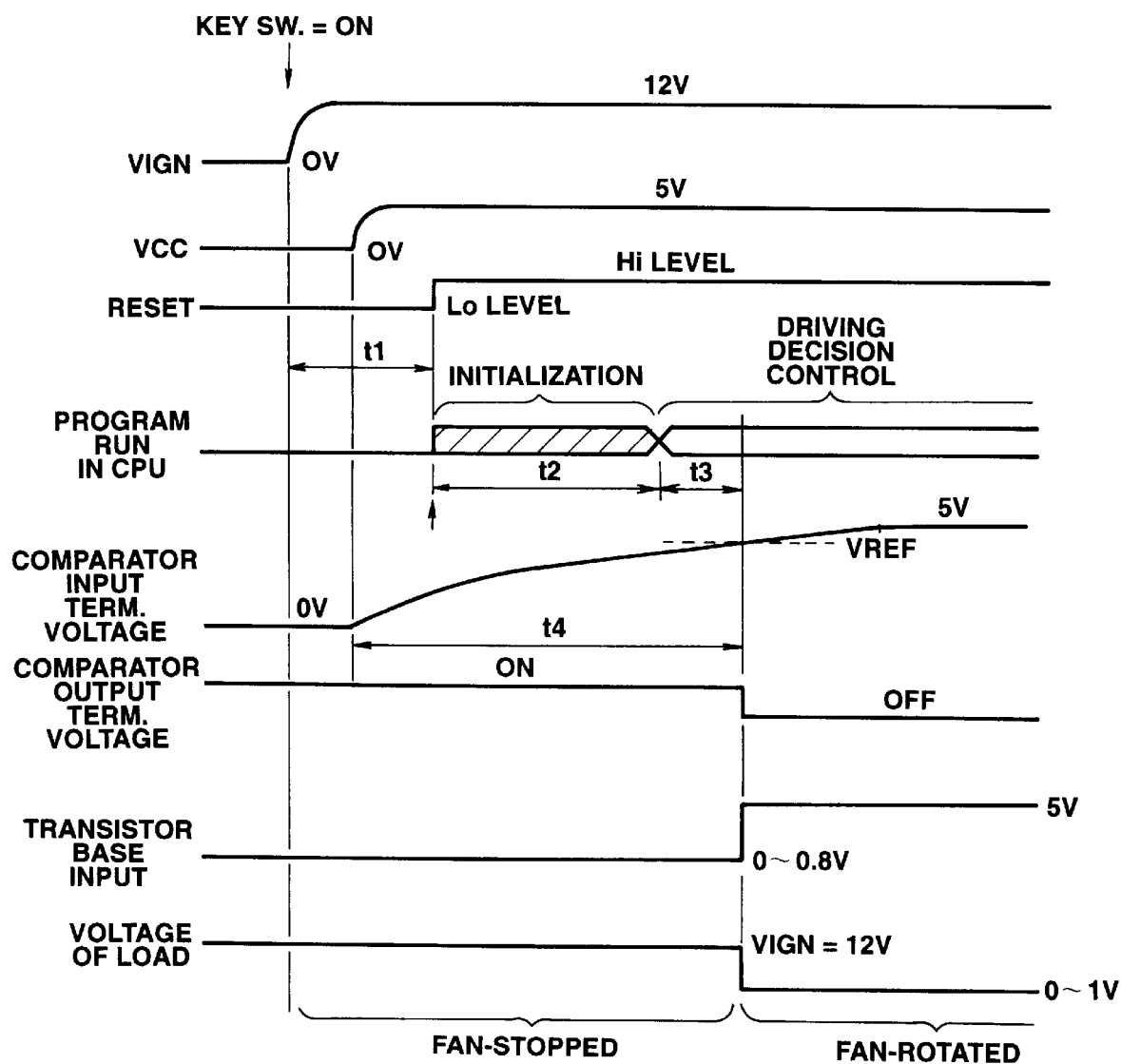
FIG. 6 is a time chart showing operation of the load driving control system of FIGS. 2 and 3 in case that an ignition key switch is turned ON immediately after the ignition key switch is turned OFF during cruising of the vehicle equipped with the load driving control system.

When the voltage at the input terminal of each comparator connected to the timer circuit 35 has reached the preset voltage VREF, the output terminal of each comparator 31, 32, 33, 34 is turned OFF (producing a high resistance), thereby establishing a condition in which the base voltage (5V) is impressed on each transistor 23, 24, 25, 26 connected to this output terminal. Consequently, the relay switch which is decided to meet the driving condition in the driving decision control is turned ON so as to drive the corresponding motor 6, 7, 8, 10. It is to be noted that the time chart of FIG. 6 shows a status in which re-starting of the engine is made at a high temperature condition due to the vehicle cruising, so that the fan rotates immediately after lapse of a preset time t4 of the comparator.

Here, the driving ports 20c, 20d, 20e, 20f are kept at a high impedance condition (a high resistance condition) during a time period (t1+t2). When control comes into the driving decision control, the driving ports become in a high level voltage condition (at 4.5V or higher) or a low level voltage condition (0.5V or lower) during a time period (t3). However, in any condition, the base voltage in each transistor 23, 24, 25, 26 is maintained at a value of 0V to 0.8V when time lapses over the time t4 to turn OFF each comparator 31, 32, 33, 34, so that the load driving is compulsorily stopped.

Control made when the microcomputer is in an abnormal condition

Figure 7:
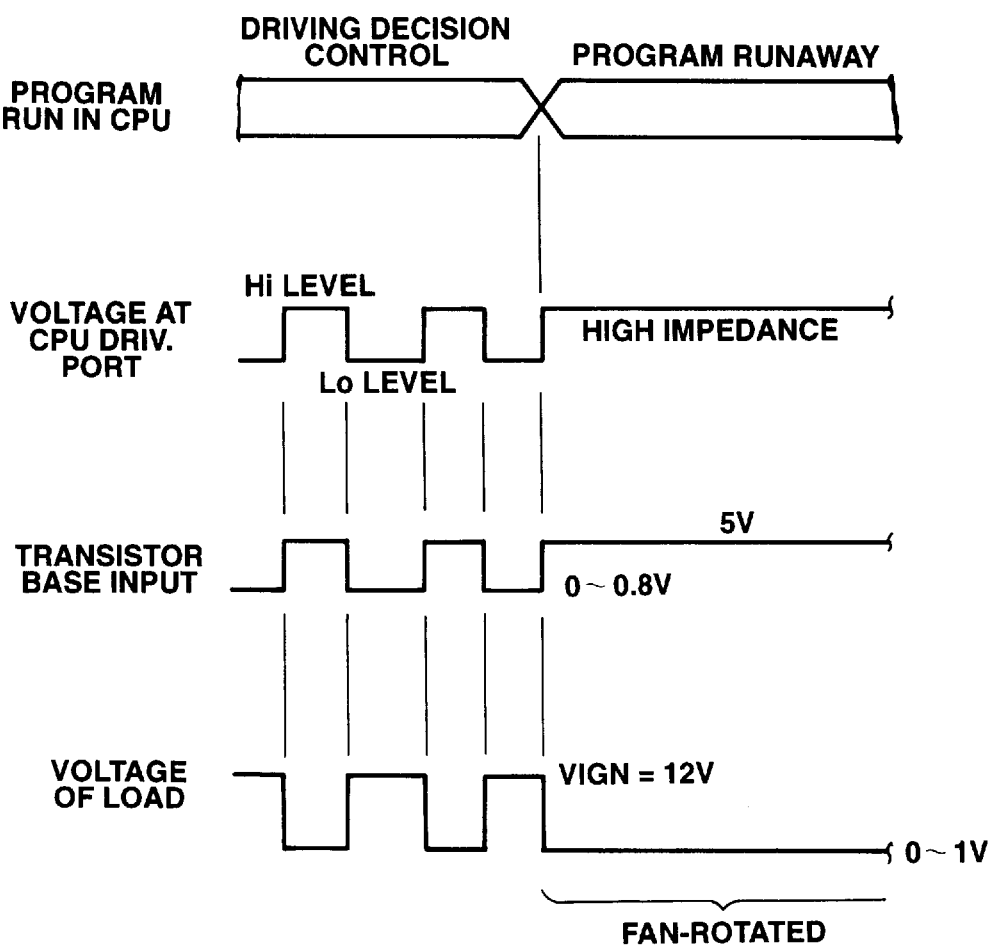
FIG. 7 is a time chart showing operation of the load driving control system of FIGS. 2 and 3 in case that abnormality of the microcomputer occurs during cruising of the vehicle equipped with the load driving control system.

Assume that the microcomputer of CPU 20 is changed from its normal condition to its abnormal condition in the vehicle equipped with the load driving control system of the embodiment. Operation made in such a case will be discussed with reference to FIG. 7.

During the normal condition of the microcomputer 20, control of driving or stopping each motor 6, 7, 8, 10 is accomplished in accordance with the high or low level voltage condition of the driving ports 20c, 20d, 20e, 20f. In other words, the pull-up resistance and the comparator serve as high resistances in the load driving circuit, and therefore it may be possible to study the operation under the normal condition of the microcomputer by using a circuit without these circuit parts, in place of the actual circuit.

Accordingly, the base current flows in each transistor 23, 24, 25, 26 when the driving port 20c, 20d, 20e, 20f is in the high level voltage condition, whereas the base current stops to flow when the driving port is in the low level voltage condition. Thus, the driving for the motors can be controlled in accordance with the driving decision controlled.

However, when the abnormality of the microcomputer (20) occurs, for example, owing to program runaway, the driving ports 20c, 20d, 20e, 20f are brought into their high impedance condition. In other words, a resistance at the driving port and the comparator serves as very high resistances, and therefore it may be possible to study the operation under the occurrence of the abnormality in the microcomputer by using a circuit having only pull-up resistances, in place of the actual circuit.

Accordingly, when the driving port is at the high impedance condition, the driving voltage Vcc is impressed on each transistor 23, 24, 25, 26, so that each motor 6, 7, 8, 10 is compulsorily driven.

Next, advantageous effects of the load driving control system of this embodiment will be discussed.

(a) By virtue of using the pull-up resistor 27, 28, 29, 30 as the load compulsorily driving requirement circuit connected to the load driving circuit, the load such as the fan motor can be compulsorily driven when the decision command is not output from the CPU 20 even though the ignition key switch 13 is turned ON. This achieves a fail-safe operation by securing the load driving even when abnormality of the microcomputer occurs.

(b) By virtue of using the comparator as the load driving stopping requirement circuit connected to the load driving circuit, the compulsory load driving can be stopped at least during a time period for completing the initialization of the microcomputer. This prevents an unnecessary stress from being applied to the load, thereby improving a reliability in durability.

(c) The load driving circuit includes the transistor 23, 24, 25, 26 whose base current is controlled in accordance with one of high and low level voltages which correspond respectively to the load driving necessariness and unnecessariness commands of a microcomputer, and the relay switch 16, 17, 18, 19 which is turned ON when the base current is generated in the transistor. The load compulsorily driving circuit includes the pull-up resistor 27, 28, 29, 30 which is connected to the base side of the transistor so as to cause the base current to flow in the transistor even though the output port 20c, 20d, 20e, 20f of the microcomputer is in a high impedance condition. Additionally, the load driving stopping requirement circuit includes the comparator 31, 32, 33, 34 having the first input terminal connected to the timer circuit 35 whose voltage increases according to a time constant determined in accordance with the resistor and a capacitor, the second input terminal to which the preset voltage is applied, and the output terminal which is connected to the base side of the transistor 23, 24, 25, 26. By virtue of the above, a fail-safe operation upon occurrence of abnormality of the microcomputer is effectively achieved while improving the reliability in durability of the load driving control system.

(d) Since the motors 6, 7, 8, 10 for the fan 3, 4, 5, 9 for the engine coolant radiator 2 are used as the load, a fail-safe for preventing an engine overheat can be effectively achieved even when an abnormality of the microcomputer occurs, while improving the reliability in durability of the fan motor 6, 7, 8, 10 and the relay switch 16, 17, 18, 19.

While the embodiment has been discussed with reference to the drawings, it will be appreciated that the scope of the present invention is not limited to the specified embodiment and therefore the embodiment falls within the scope of the invention if modification, addition and the like are made thereto without separating from the spirit and the scope of the invention.

Although the load in the embodiment has been shown and described as being the electric fan motor for the engine radiator, it will be understood that the electric fan motor may be replaced with other loads which are to be driven even under occurrence of abnormality of the microcomputer for the purpose of fail-safe, examples of such other loads being motors for pumps each motor forming part of a hydraulic unit of a vehicle control system such as a suspension, a 4WS (four wheel steering), a 4WD (four wheel driving), and an ABS (anti-lock brake system) or the like.

While the load compulsorily driving requirement circuit and the load driving stopping requirement circuit has been shown and described as including the resistor and the comparator, it will be appreciated that the circuits may be replaced with other circuits or means including a program set in the CPU, for achieving the same purpose and function.

What is claimed is:

1. A load driving control system for a vehicle having a load, comprising:

a detector for detecting an operating condition of the vehicle;

a microcomputer storing a load driving necessariness decision program by which a decision is made as to whether driving the load is necessary or not in accordance with the detected vehicle operating condition so as to output one of load driving necessariness and unnecessariness commands;

a load driving circuit for controlling driving of the load in accordance with the load driving necessariness and unnecessariness commands, said load driving circuit being arranged to provide a driving current in response to the load driving necessariness command, the load being driven under action of said driving current;

a compulsory drive circuit for compulsorily driving the load when the microcomputer stops outputting each command even though an ignition key switch is turned ON; and a compulsory drive stopping circuit for stopping the compulsory load driving at least during a time period in which an initialization of the microcomputer is completed, when the microcomputer stops outputting each command owing to the initialization of the microcomputer.

2. A load driving control system as claimed in claim 1, wherein said load driving circuit includes a transistor whose base current is controlled in accordance with one of high and low level voltages which correspond respectively to the load driving necessariness and unnecessariness commands of the microcomputer, and a relay switch which is turned ON when the base current is generated in said transistor; and said compulsory drive circuit includes a pull-up resistor which is connected to a base side of said transistor so as to cause the base current to flow in said transistor even though an output port of the microcomputer is in a high impedance condition.

3. A load driving control system as claimed in claim 2, wherein said compulsory drive stopping circuit includes a comparator having a first input terminal connected to a circuit whose voltage increases according to a time constant determined in accordance with the resistor and a capacitor, a second input terminal to which a preset voltage is applied, and an output terminal which is connected to a base side of said transistor.

4. A load driving control system as claimed in claim 2, further comprising a power circuit connected to the microcomputer and conficured to determine if a normal running operation signal is periodically output by the microcomputer, wherein, if said power circuit determines that the normal running operation signal is not periodically output by the microcomputer, said power circuit outputs a reset command to reset the microcomputer.

5. A load driving control system as claimed in claim 4, wherein, when the microcomputer is reset upon reception of the reset command, said compulsory drive stopping circuit does not allow the load to be driven for a predetermined time after the microcomputer has received the reset command, to thereby allow the microcomputer to perform the initialization without having to output any of said load drive necessariness and unnecessariness commands.

6. A load driving control system as claimed in claim 5, further comprising a memory for storing a control program to be run by the microcomputer, wherein the microcomputer determines whether the memory is operating normally or not, and outputs the normal running operation signal either periodically or not based on the determination as to whether the memory is operating normally or not.

7. A load driving control system as claimed in claim 1, wherein said load includes an electric motor for a fan for a radiator which cools an engine coolant.

8. A load driving control method for a vehicle having a load, the method comprising the steps of:

detecting an operating condition of the vehicle;

storing, in a microcomputer, a load driving necessariness decision program by which a decision is made as to whether driving the load is necessary or not in accordance with the detected vehicle operating condition so as to output one of load driving necessariness and unnecessariness commands;

controlling driving of the load in accordance with the load driving necessariness and unnecessariness commands;

providing a driving current in response to the load driving necessariness command, the load being driven under action of said driving current;

compulsorily driving the load when the microcomputer stops outputting each command even though an ignition key switch is turned ON; and stopping the compulsory load driving at least during a time period in which an initialization of the microcomputer is completed, when the microcomputer stops outputting each command owing to the initialization of the microcomputer.

9. A load driving control method as claimed in claim 8, further comprising the step of:

determining if a normal running operation signal is periodically output by the microcomputer, wherein, if it is determined that said normal running operation signal is not periodically output by the microcomputer, outputting a reset command to reset the microcomputer.

10. A load driving control method as claimed in claim 9, wherein, when the microcomputer is reset upon reception of the reset command, the load is not allowed to be driven for a predetermined time after the microcomputer has received the reset command, to thereby allow the microcomputer to perform the initialization without having to output any of said load drive necessariness and unnecessariness commands.

* * * * *